No. 836,021. PATENTED NOV. 13, 1906.
W. F. ELLIOTT.
FLY SHIELD.
APPLICATION FILED MAR. 9, 1906.
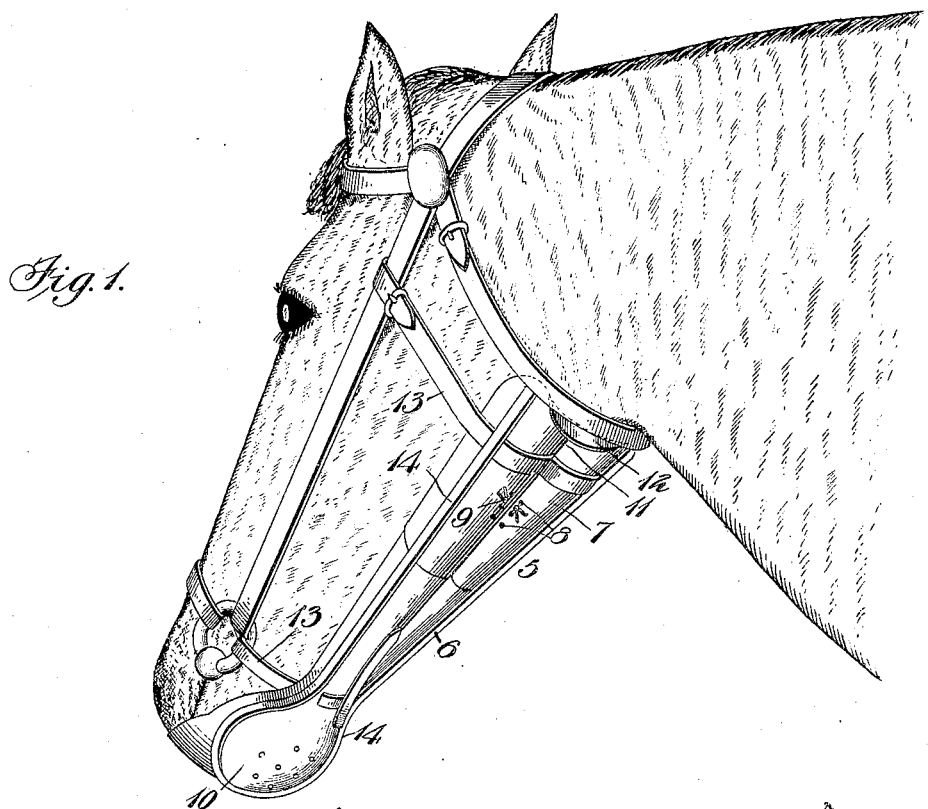
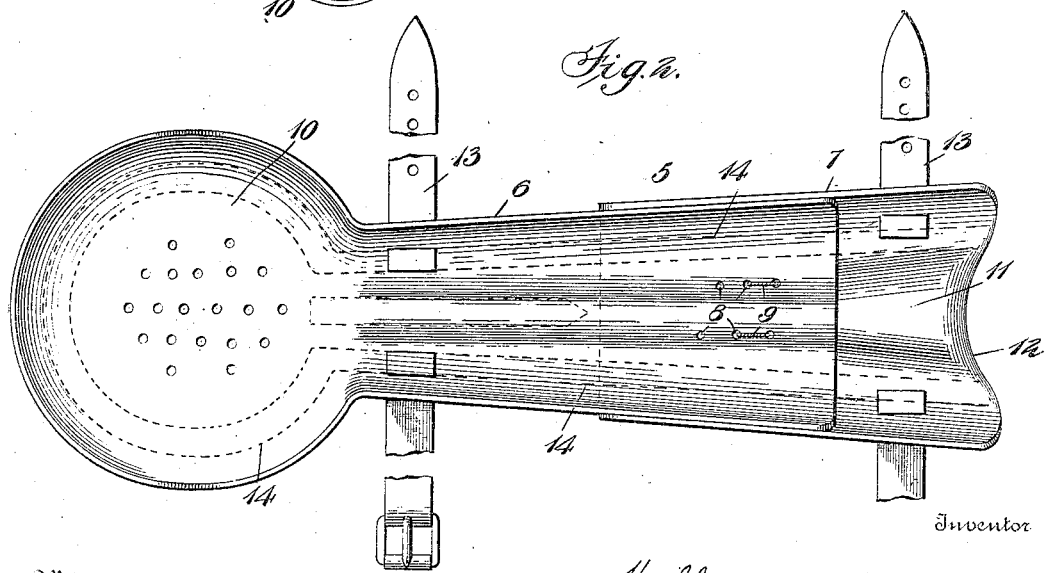

UNITED STATES PATENT OFFICE.

WILLIAM F. ELLIOTT, OF DE KALB, ILLINOIS.

FLY-SHIELD.

No. 836,021.  Specification of Letters Patent.  Patented Nov. 13, 1906.

Application filed March 9, 1906. Serial No. 305,168.

*To all whom it may concern:*

Be it known that I, WILLIAM F. ELLIOTT, a citizen of the United States, residing at De Kalb, in the county of Dekalb and State of Illinois, have invented new and useful Improvements in Fly-Shields, of which the following is a specification.

My invention is a fly-shield, and more particularly a device for protecting the throat and lips of horses and other animals from bott-flies or other insects; and it consists in certain novel features of construction herein described and claimed.

In the accompanying drawings, Figure 1 is a perspective view of the invention, showing the application thereof. Fig. 2 is a plan view of the shield removed.

Referring specifically to the drawings, the shield is indicated at 5 and is shaped to fit snugly under the lower jaw of the animal. The shield is in two sections, which are indicated at 6 and 7, respectively. The sections lap and are fastened together by any suitable means. As shown in the drawings, the lapped portions of the sections have perforations 8, which are made to register, and a string or piece of wire 9 is then passed through the registering perforations and its ends tied. Upon sliding the two sections back or forth lengthwise, so that a different set of perforations register, and then fastening the parts as stated the shield can be adjusted to properly fit the jaw of the animal. It is therefore not necessary to make the shield in different sizes, and one standard size can be readily adjusted to fit any jaw.

The lower end of the shield is made cup-shaped, as at 10, and fits over both lips of the animal. The upper end of the shield is formed with a ridge or raised portion 11, which extends between the jaw-bones to assist in keeping the shield in place, and this end of the shield is also curved, as at 12, to fit the throat closely. The shield is provided at each end with attaching-straps 13, whereby it is secured to the animal, said straps being fastened to the bridle.

The shield will preferably be made of rubber, so that if accidentally disarranged it will spring back into its place. It is also reinforced by ribs 14 to give it the necessary stiffness.

The shield is designed to protect animals from the attacks of insects, and especially bott-flies, which approach from below and deposit their eggs on the lips and throat of the animal. These parts are effectively protected by a shield constructed and arranged as herein described.

I claim—

An insect-shield comprising a body portion having lengthwise-adjustable sections which are shaped to fit under the jaw of the animal, and one of said sections having a cup-shaped end fitting over the lips of the animal.

In testimony whereof I have signed my name to this specification in the presence of two subscribing witnesses.

WILLIAM F. ELLIOTT.

Witnesses:
 DAVID WADDELL,
 GEORGE MARSTON.